(12) United States Patent
Kondo

(10) Patent No.: US 11,025,833 B2
(45) Date of Patent: Jun. 1, 2021

(54) VIDEO SIGNAL PROCESSING APPARATUS, VIDEO SIGNAL PROCESSING METHOD, AND PROGRAM FOR PERFORMING VIDEO SIGNAL PROCESSING IN CONSIDERATION OF BEHAVIOR OF LIGHT IN NATURE

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

(*) Notice: Subject to any disclaimer, the term of this patent is extended or adjusted under 35 U.S.C. 154(b) by 66 days.

(21) Appl. No.: 16/313,527

(22) PCT Filed: Jun. 29, 2017

(86) PCT No.: PCT/JP2017/024008
§ 371 (c)(1),
(2) Date: Dec. 27, 2018

(87) PCT Pub. No.: WO2018/003937
PCT Pub. Date: Jan. 4, 2018

(65) Prior Publication Data
US 2020/0186724 A1    Jun. 11, 2020

(30) Foreign Application Priority Data
Jun. 30, 2016 (JP) .............................. JP2016-129687

(51) Int. Cl.
*H04N 5/243* (2006.01)
*H04N 5/232* (2006.01)
(52) U.S. Cl.
CPC ............. *H04N 5/243* (2013.01); *H04N 5/232* (2013.01)
(58) Field of Classification Search
CPC ....... H04N 5/235; H04N 5/2351; H04N 5/243
See application file for complete search history.

(56) References Cited

U.S. PATENT DOCUMENTS

2010/0303372 A1    12/2010    Zhao et al.
2015/0281664 A1*   10/2015    Tada ...................... H04N 9/646
                                                    348/223.1
2016/0100122 A1    4/2016    Nakajima et al.

FOREIGN PATENT DOCUMENTS

CN    104954771 A    9/2015
EP    1465003 A1    10/2004
(Continued)

OTHER PUBLICATIONS

International Search Report issued in Application No. PCT/JP2017/024008 dated Aug. 8, 2017, with English translation.
(Continued)

*Primary Examiner* — Nicholas G Giles
(74) *Attorney, Agent, or Firm* — McDermott Will & Emery LLP

(57) ABSTRACT

In order to address a conventional problem that video signal processing in consideration of behavior of light in nature has not been performed, a video signal processing apparatus includes: a storage unit in which correspondence information indicating correspondence between optical signal information related to an optical signal in an environment in which an image is acquired and electrical signal information related to an electrical signal in the environment is stored; an input image accepting unit that accepts an input image; an optical signal information acquiring unit that acquires optical signal information corresponding to electrical signal information acquired from the input image, using the correspondence information; a conversion processing unit that performs conversion processing that acquires an output image from the input image, using the optical signal information acquired by the optical signal information acquiring unit; and an output unit that outputs the output image.

(Continued)

Accordingly, it is possible to perform video signal processing in consideration of behavior of light in nature.

15 Claims, 7 Drawing Sheets

(56) References Cited

FOREIGN PATENT DOCUMENTS

| EP | 1 667 066 A1 | 6/2006 |
|---|---|---|
| EP | 2 747 415 A1 | 6/2014 |
| EP | 2 958 073 A1 | 12/2015 |
| JP | H11-84501 A | 3/1999 |
| JP | 2010-534432 A | 11/2010 |
| JP | 2013-172224 A | 9/2013 |
| JP | 2014-150308 A | 8/2014 |
| WO | 2014/162533 A1 | 10/2014 |

OTHER PUBLICATIONS

Extended European Search Report dated Dec. 10, 2019, issued in EP Application No. 17820291.7.
First Office Action issued in corresponding Chinese Application No. 201780038350.9, dated Jul. 30, 2020, with English language translation.
Notification Letter of Review Opinion dated Mar. 19, 2021 in Taiwan Patent Application No. 106122105, with English translation.
Second Office Action issued on Apr. 1, 2021 in Chinese Application No. 201780038350.9, with English translation.

\* cited by examiner

VIDEO SIGNAL PROCESSING APPARATUS, VIDEO SIGNAL PROCESSING METHOD, AND PROGRAM FOR PERFORMING VIDEO SIGNAL PROCESSING IN CONSIDERATION OF BEHAVIOR OF LIGHT IN NATURE

RELATED APPLICATIONS

This application is the U.S. National Phase under 35 U.S.C. § 371 of International Application No. PCT/JP2017/024008, filed Jun. 29, 2017, which in turn claims the benefit of Japanese Application No. 2016-129687, filed on Jun. 30, 2016, the disclosures of which are incorporated by reference herein.

BACKGROUND OF THE INVENTION

1. Field of the Invention

The present invention relates to a video signal processing apparatus and the like for processing video signals.

2. Description of Related Art

Conventionally, there are video signal processing apparatuses capable of avoiding a problem that the same pixel data stored in memories is simultaneously read by multiple processes, without enlarging the sizes of the memories in which video signals are stored (see JP 2014-150308A, for example).

However, according to such conventional techniques, video signal processing in consideration of behavior of light in nature has not been performed. This sort of processing is problematic in that an image obtained as a result of the video signal processing is very unnatural as a video in which light shines on a subject in nature. Examples of behavior of light in nature include "absorption", "transmission", "reflection", "scattering", and the like, which are behavior of light that is shining on an object. Examples of behavior of light in nature include "refraction", "diffraction", and the like, which are behavior of light that is being transmitted through a medium.

SUMMARY OF THE INVENTION

A first aspect of the present invention is directed to a video signal processing apparatus, including: a storage unit in which correspondence information indicating correspondence between optical signal information related to an optical signal in an environment in which an image is acquired and electrical signal information related to an electrical signal in the environment is stored; an input image accepting unit that accepts an input image; an optical signal information acquiring unit that acquires optical signal information corresponding to electrical signal information; a conversion processing unit that performs conversion processing that acquires an output image from the input image, using the optical signal information acquired by the optical signal information acquiring unit; and an output unit that outputs the output image acquired by the conversion processing unit.

With this configuration, it is possible to perform video signal processing in consideration of behavior of light in nature.

Furthermore, a second aspect of the present invention is directed to the video signal processing apparatus according to the first aspect, wherein the correspondence information is a look-up table having two or more correspondence records each indicating correspondence between optical signal information and electrical signal information, and the optical signal information acquiring unit selects a correspondence record corresponding to electrical signal information that matches or is closest to electrical signal information that is acquired from the input image accepted by the input image accepting unit, and acquires optical signal information corresponding to the selected correspondence record.

With this configuration, it is possible to perform video signal processing in consideration of behavior of light in nature.

Furthermore, a third aspect of the present invention is directed to the video signal processing apparatus according to the first aspect, wherein the correspondence information has electrical signal information that is an operation expression corresponding to electrical signal information and related to a tap arranged in spacetime, the optical signal information acquiring unit acquires an operation expression corresponding to electrical signal information that is acquired from the input image accepted by the input image accepting unit, and the conversion processing unit performs conversion processing that converts the input image using the operation expression acquired by the optical signal information acquiring unit, thereby acquiring an output image.

With this configuration, it is possible to perform video signal processing in consideration of behavior of light in nature.

Furthermore, a fourth aspect of the present invention is directed to the video signal processing apparatus according to the first aspect, wherein the correspondence information is a look-up table having two or more correspondence records each indicating correspondence between electrical signal information and a processing identifier for identifying processing, the optical signal information acquiring unit selects a correspondence record corresponding to electrical signal information that matches or is closest to electrical signal information that is acquired from the input image accepted by the input image accepting unit, and acquires optical signal information that is a processing identifier corresponding to the selected correspondence record, and the conversion processing unit performs conversion processing that performs processing that is identified by the processing identifier acquired by the optical signal information acquiring unit, thereby acquiring an output image from the input image.

With this configuration, it is possible to perform video signal processing in consideration of behavior of light in nature.

Furthermore, a fifth aspect of the present invention is directed to the video signal processing apparatus according to any one of the first to fourth aspects, wherein the conversion processing unit performs quality improving processing that converts the input image into an image with a higher quality, using the optical signal information acquired by the optical signal information acquiring unit, thereby acquiring an output image.

With this configuration, it is possible to perform quality improving processing on a video signal, in consideration of behavior of light in nature.

Furthermore, a sixth aspect of the present invention is directed to the video signal processing apparatus according to any one of the first to fourth aspects, wherein the conversion processing unit performs resolution increasing processing that converts the input image into an image with a higher resolution, using the optical signal information acquired by the optical signal information acquiring unit, thereby acquiring an output image.

With this configuration, it is possible to perform resolution increasing processing of a video signal, in consideration of behavior of light in nature.

Furthermore, a seventh aspect of the present invention is directed to the video signal processing apparatus according to any one of the first to fourth aspects, wherein the conversion processing unit performs noise removing processing on the input image, using the optical signal information acquired by the optical signal information acquiring unit, thereby acquiring an output image.

With this configuration, it is possible to perform noise removing processing on a video signal, in consideration of behavior of light in nature.

Furthermore, an eighth aspect of the present invention is directed to the video signal processing apparatus according to any one of the first to fourth aspects, wherein the electrical signal information is range information indicating a signal range of an electrical signal, and the conversion processing unit performs first conversion processing on the input image and acquires an output image candidate, determines whether or not signal intensity of the output image candidate is within a range indicated by the range information, and, in a case where it is determined that the signal intensity of the output image candidate is not within the range indicated by the range information, quantizes the input image again and converts the input image such that the signal intensity is within the range indicated by the range information, thereby acquiring an output image.

With this configuration, it is possible to obtain an output image with signal intensity in consideration of behavior of light in nature.

Furthermore, a ninth aspect of the present invention is directed to the video signal processing apparatus according to any one of the first to eighth aspects, wherein the video signal processing apparatus further includes: a user instruction accepting unit that accepts an optical signal information change instruction to change optical signal information; and an optical signal information changing unit that changes optical signal information that is stored, according to the optical signal information change instruction, and the conversion processing unit acquires an output image, using the optical signal information changed according to the optical signal information change instruction.

With this configuration, it is possible to obtain an output image reflecting intentions of a user.

According to the video signal processing apparatus of the present invention, it is possible to perform video signal processing in consideration of behavior of light in nature.

DETAILED DESCRIPTION OF THE INVENTION

Figure 1:
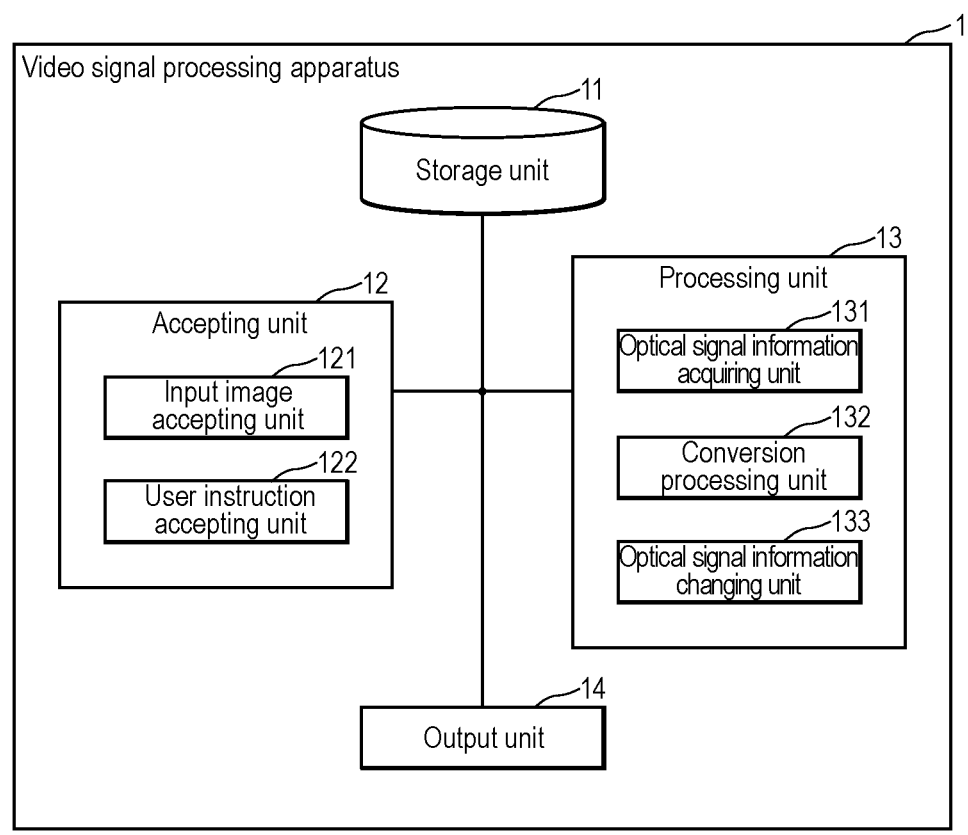
FIG. 1 is a block diagram of a video signal processing apparatus 1 in Embodiment 1.

Hereinafter, an embodiment of a video signal processing apparatus and the like will be described with reference to the drawings. It should be noted that constituent elements denoted by the same reference numerals in the embodiments perform similar operations, and thus a description thereof may not be repeated.

Embodiment 1

In this embodiment, a video signal processing apparatus that performs video signal processing for converting an input video signal into an output video signal in consideration of behavior of light in nature will be described.

More specifically, in this embodiment, a video signal processing apparatus that applies an input image that is accepted to correspondence information indicating correspondence between later-described optical signal information and later-described electrical signal information, and performs conversion processing on the input image using the thus obtained optical signal output, thereby acquiring an output image will be described.

FIG. 1 is a block diagram of a video signal processing apparatus 1 in this embodiment.

The video signal processing apparatus 1 includes a storage unit 11, an accepting unit 12, a processing unit 13, and an output unit 14.

The accepting unit 12 includes an input image accepting unit 121 and a user instruction accepting unit 122.

The processing unit 13 includes an optical signal information acquiring unit 131, a conversion processing unit 132, and an optical signal information changing unit 133.

The video signal processing apparatus 1 is, for example, a video output apparatus such as a television receiver, a Blu-ray (registered trademark) recorder, or a DVD (registered trademark) recorder, a camera, a photo output apparatus, or the like, and there is no limitation on the apparatus as long as it can process video signals. The video is typically a moving image, which is a group of two or more still images, but also may be one still image.

In the storage unit 11, various types of information can be stored. The various types of information are, for example, correspondence information. The various types of information are, for example, an optical signal database having one or at least two pieces of optical signal information, or an electrical signal database having one or at least two pieces of electrical signal information. The various types of information are, for example, a program for performing processing associated with a later-described processing identifier.

Furthermore, the correspondence information is information indicating correspondence between optical signal information and electrical signal information. The correspondence information is information that is used to convert an image while applying constraints such that light emitted from an output image does not behave in a very unnatural manner as light in nature. The correspondence information is, for example, information for acquiring a proper amount of change in an electrical signal in accordance with the amount of change in light. The correspondence information indicating correspondence between optical signal information and electrical signal information may be electrical signal information.

The optical signal information is information related to an optical signal in an environment in which an image is acquired (typically, an environment in nature). The optical signal information is, for example, information indicating a feature of an optical signal (which may be referred to as an optical signal feature). The optical signal information is, for example, information indicating that the resolution is infinite, information indicating that there is no upper limit or lower limit of a signal range, which is an amplitude of signal intensity, or the like. The optical signal information is, for example, intensity itself (a lux value, etc.) of light. The optical signal information is typically information obtained by measuring light in nature. The optical signal information is, for example, range information indicating a signal range. The optical signal information is, for example, light amount change information indicating a change in the amount of light in a unit time or a predetermined period of time. The optical signal information is, for example, diffusion level change information indicating a change in a diffusion level of a light source in a unit time or a predetermined period of time. The diffusion level information is, for example, a diffusion angle. The optical signal information is, for example, light source positional change information indicating a continuous change in a position of a light source in a unit time or a predetermined period of time. The light source positional change information is, for example, a coordinate position of a start point, a coordinate position of an end point, and a moving speed. The optical signal information is, for example, information indicating whether light that is shining on an object in an image is direct light or diffused light. The optical signal information is, for example, information indicating whether light that is reflected by an object in part of an image (e.g., one block in an image) is mirror-reflected or diffuse-reflected.

Furthermore, the electrical signal information is information related to an electrical signal. The electrical signal information is, for example, information indicating a feature of an electrical signal (which may be referred to as an electrical signal feature). The electrical signal information is, for example, information indicating that quantization was performed at a particular number of bits (e.g., 10 bits), or information indicating a signal range (e.g., 64 to 940). The electrical signal information is, for example, a proper amount of change in an electrical signal. The electrical signal information is, for example, intensity itself (a pixel value) of an electrical signal. The electrical signal information is, for example, a later-described processing identifier. The electrical signal information is, for example, image change specifying information for specifying a change in an image. The image change specifying information is, for example, information indicating the amount of change in a pixel value, or information indicating the amount of change in luminance.

If the optical signal information is light amount change information, and the electrical signal information is image change specifying information, the correspondence information is information for specifying a change in an image when the amount of light is changed. If the optical signal information is diffusion level change information, and the electrical signal information is image change specifying information, the correspondence information is information for specifying a change in an image when the diffusion level of a light source is changed. If the optical signal information is light source positional change information, and the electrical signal information is image change specifying information, the correspondence information is information for specifying a change in an image when the position of a light source is changed. The change in the position of a light source is, for example, a change "from a position directly above a subject to a position just therebeside", "from a position in front of a subject to a position therebehind", or the like.

Furthermore, the correspondence information may be, for example, a look-up table having two or more correspondence records each indicating correspondence between optical signal information and electrical signal information.

The look-up table is, for example, information indicating a behavioral corresponding relationship between an optical signal and an electrical signal. For example, the information indicating a corresponding relationship is, for example, a signal range of a quantized electrical signal and a signal range of an optical signal with an infinite gradation, corresponding to the signal range of the electrical signal. The information indicating a corresponding relationship is, for example, an acceptable range of a change in an optical signal when an electrical signal is changed. That is to say, the look-up table or the correspondence information may be only optical signal information.

Furthermore, the look-up table has one or at least two correspondence records. Each correspondence record is information for identifying correspondence between the whole or part of one or at least two input images and the whole or part of one or at least two output images. If the number of correspondence records contained in the look-up table is one, the correspondence record is, for example, an operation expression for converting an image, or one or more parameter groups that are to be given to an operation expression for converting an image. Examples of the parameter include a coefficient of a multiply-accumulate operation, a level for changing a difference or a ratio between brightness and darkness, a determination parameter, and the like. The determination parameter is a threshold that is used for determination, and examples thereof include a threshold for a pixel value or the like for determining whether light is mirror-reflected or diffuse-reflected, a threshold for a pixel value or the like for determining whether light is direct light or diffused light, and the like.

Furthermore, the correspondence information may have optical signal information or electrical signal information that is an operation expression corresponding to an input image and related to a tap arranged in spacetime. The operation expression is, for example, an equation for multiplying each of multiple taps on an input image by a predetermined coefficient and accumulating the products. The operation expression is, for example, an equation for multiplying each of multiple taps on an input image by a coefficient obtained from optical signal information and accumulating the products. The tap refers to pixel values of a pixel of interest and pixels in the vicinity thereof in an input image. That is to say, the operation expression related to a tap arranged in spacetime is an operation expression of the multiply-accumulate operation for multiplying each of pixel values of a pixel of interest and pixels in the vicinity thereof in an input image by a predetermined coefficient, and computing the sum of all results obtained through the multiplication. The pixel of interest and the pixels in the vicinity thereof in an input image are two or more pixels, and there is no limitation on the number of the pixels.

The correspondence information may be a look-up table having two or more correspondence records each indicating correspondence between optical signal information and a processing identifier for identifying processing. The processing identifier is information corresponding to a program for realizing processing, and examples thereof include a program name, an executable module name, a program ID, and the like.

The accepting unit 12 accepts various types of information. The various types of information are, for example, an input image or optical signal information. The accepting is typically receiving information transmitted via a wired or wireless communication line, but is a concept that encompasses accepting information read from a storage medium such as an optical disk, a magnetic disk, or a semiconductor memory, accepting information input from an input device such as a keyboard, a mouse, or a touch panel, and the like.

The input image accepting unit 121 accepts an input image. The input image is, for example, an image transmitted from an unshown broadcasting apparatus. The input image is, for example, an image stored in a storage medium. The input image accepted by the input image accepting unit 121 is typically two or more input images (which may be referred to as frames or fields), but may be one input image (which may be referred to as a frame or a field). The multiple frames or fields that are accepted may be simply referred to as input images.

The user instruction accepting unit 122 accepts a user instruction. The user instruction is, for example, an optical signal information change instruction, which is an instruction to change optical signal information. The accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like. The user instruction may be input via any part such as a touch panel, a keyboard, a mouse, a menu screen, or the like.

The processing unit 13 performs various types of processing. The various types of processing are, for example, processing that is performed by the optical signal information acquiring unit 131 or the conversion processing unit 132.

The optical signal information acquiring unit 131 acquires optical signal information corresponding to electrical signal information that is acquired from the input image accepted by the input image accepting unit 121. The optical signal information acquiring unit 131 typically acquires optical signal information corresponding to electrical signal information that is acquired from the input image accepted by the input image accepting unit 121, using the correspondence information in the storage unit 11.

First, the optical signal information acquiring unit 131 acquires one or more pieces of electrical signal information, from the input image accepted by the input image accepting unit 121. Next, the optical signal information acquiring unit 131 acquires optical signal information corresponding to each of the one or more pieces of electrical signal information. The optical signal information acquiring unit 131 typically acquires optical signal information corresponding to each of the one or more pieces of electrical signal information, using the correspondence information in the storage unit 11.

The optical signal information acquiring unit 131 selects, for example, a correspondence record corresponding to electrical signal information that matches or is closest to electrical signal information that is acquired from the input image accepted by the input image accepting unit 121, and acquires optical signal information corresponding to the selected correspondence record.

The optical signal information acquiring unit 131 may acquire, for example, an operation expression corresponding to electrical signal information that is acquired from the input image accepted by the input image accepting unit 121.

The optical signal information acquiring unit 131 may select a correspondence record corresponding to electrical signal information that matches or is closest to electrical signal information that is acquired from the input image accepted by the input image accepting unit 121, and acquire optical signal information that is a processing identifier corresponding to the selected correspondence record.

The optical signal information acquiring unit 131 may acquire optical signal information that is acquired according to the electrical signal information and is further changed according to the optical signal information change instruction accepted by the user instruction accepting unit 122. The user instruction is, for example, to double the amount of light, to change the diffusion level of a light source, to change the position of a light source, or the like.

For example, if the user instruction is an instruction "to double the amount of light", and the optical signal information stored in the correspondence information is intensity itself of light, first, the optical signal information acquiring unit 131 selects a correspondence record corresponding to electrical signal information that matches or is closest to electrical signal information that is acquired from the input image accepted by the input image accepting unit 121, and acquires optical signal information (intensity of light) corresponding to the selected correspondence record. Next, the optical signal information acquiring unit 131 acquires optical signal information obtained by doubling the acquired optical signal information.

The conversion processing unit 132 performs conversion processing that acquires an output image from the input image, using the optical signal information acquired by the optical signal information acquiring unit 131. The conversion processing unit 132 typically performs conversion processing that acquires an output image from the input image, using the input image accepted by the input image accepting unit 121 and the optical signal information acquired by the optical signal information acquiring unit 131.

The conversion processing is, for example, later-described quality improving processing, later-described resolution increasing processing, later-described noise removing processing, or the like, but there is no limitation on the processing content. The conversion processing is, for example, processing that, after an input image is subjected to conventional image conversion processing (e.g., conventional conversion processing described in JP 2012-252685, JP 2012-252686, WO 2013/061810, etc.), determines whether or not an image obtained through the conversion has a signal that is out of an acceptable range as an electrical signal, and, if there is a signal that is out of the allowable range, performs quantization again such that the signal is not truncated.

For example, if the optical signal information is light amount change information, the conversion processing unit 132 acquires an output image from the input image, using the light amount change information. For example, if the optical signal information is a light amount change information "to double the amount of light", the conversion processing unit 132 constructs an output image by obtaining, for each pixel or each block, a pixel or a block similar to that observed when the amount of light is actually doubled, in consideration of features of the light source and reflection features of the subject, instead of simply doubling the luminance values of all pixels.

For example, if the optical signal information is diffusion level information, an output image is acquired from an input image, using the diffusion level information. For example, if the optical signal information is "information indicating that light from a light source is direct light", the conversion processing unit 132 changes the input image so as to increase the shading level of the input image, thereby acquiring an output image. On the other hand, for example, if the optical signal information is "information indicating that light from a light source is indirect light", the conversion processing unit 132 performs processing that lowers the shading level of the input image, thereby acquiring an output image. The conversion processing unit 132 adjusts the shading level, for example, by performing processing that adjusts the contrast in each block constituting the input image.

For example, if the optical signal information is light source positional change information, an output image is acquired from an input image, using the light source positional change information. The conversion processing unit 132 changes, for example, an orientation or a length of a shadow in an input image, according to the light source positional change information. The conversion processing unit 132 detects, for example, an orientation of a subject in an input image, and adjusts the intensity of light reflection according to the orientation.

The conversion processing unit 132 may perform conversion processing that converts the input image using the operation expression acquired by the optical signal information acquiring unit 131, thereby acquiring an output image. The operation expression is an example of optical signal information.

The conversion processing unit 132 may perform conversion processing that performs processing that is identified by the processing identifier acquired by the optical signal information acquiring unit 131, thereby acquiring an output image from the input image. In this case, for example, the conversion processing unit 132 calls processing corresponding to the processing identifier acquired by the optical signal information acquiring unit 131, and gives the input image to the function, thereby acquiring an output image. The processing may be a function, a module, a message in an object oriented program, or the like.

The conversion processing unit 132 may perform, for example, quality improving processing that converts the input image into an image with a higher quality, using the optical signal information acquired by the optical signal information acquiring unit 131, thereby acquiring an output image. The improving the quality is processing that converts an image into an image with a more specific material appearance, a better sense of distance, and the like. The quality improving processing is a known technique, and thus a detailed description thereof has been omitted.

The conversion processing unit 132 may perform, for example, resolution increasing processing that converts the input image into an image with a higher resolution, using the optical signal information acquired by the optical signal information acquiring unit 131, thereby acquiring an output image. There are many types of resolution increasing processing including known techniques, and there is no limitation on the processing content.

The conversion processing unit 132 may perform, for example, noise removing processing on the input image, using the optical signal information acquired by the optical signal information acquiring unit 131, thereby acquiring an output image. There are many types of noise removing processing including known techniques, and there is no limitation on the processing content.

The conversion processing unit 132 may perform different processing, for example, depending on how light is shining on an object in the input image or the reflection feature of the object, as follows. There is no limitation on the object, as long as it is in an input image, and examples thereof include natural objects such as valleys and rivers, living things such as humans and animals, still lifes such as cups and houses, and the like, in an input image.

That is to say, the optical signal information acquiring unit 131 analyzes an input image, and determines whether light that is shining on an object in the input image is direct light or diffused light, using electrical signal information of the input image. If the light is direct light, the conversion processing unit 132 modifies pixel values of pixels in the input image, for example, so as to emphasize a difference or a ratio between brightness and darkness in the entire input image. On the other hand, if the light is diffused light, the conversion processing unit 132 modifies pixel values of pixels in the input image, for example, so as not to change a difference or a ratio between brightness and darkness in the entire input image, or so as to reduce a difference or a ratio between brightness and darkness in the entire input image. The optical signal information acquiring unit 131 determines whether the light is direct light or diffused light, for example, using pixel values of pixels in the input image, luminance values of pixels in the input image, distribution of pixel values of pixels in the input image, distribution of luminance values of pixels in the input image, and the like.

Furthermore, the optical signal information acquiring unit 131 divides the input image into two or more blocks, and determines whether light that is reflected by an object in each block is mirror-reflected or diffuse-reflected, using electrical signal information of the block. For a block in which light is mirror-reflected, the conversion processing unit 132 modifies pixel values of pixels in the block, for example, so as to emphasize a difference or a ratio between brightness and darkness in the entire block. On the other hand, for a block in which light is diffuse-reflected, the conversion processing unit 132 modifies pixel values of pixels in the block, for example, so as not to change a difference or a ratio between brightness and darkness in the entire block, or so as to reduce a difference or a ratio between brightness and darkness in the entire block. The optical signal information acquiring unit 131 determines whether the light is mirror-reflected or diffuse-reflected, for example, using pixel values of pixels in the block, luminance values of pixels in the block, distribution of pixel values of pixels in the block, distribution of luminance values of pixels in the block, and the like.

Furthermore, there are many types of processing for emphasizing a difference or a ratio between brightness and darkness in the entire input image or the entire block and processing for reducing a difference or a ratio between brightness and darkness in the entire input image or the entire block including known techniques, and there is no limitation on the processing content.

Furthermore, if the optical signal information acquiring unit 131 divides the input image into two or more blocks, there is no limitation on how to divide the image. The optical signal information acquiring unit 131 divides the input image, for example, into rectangular blocks with the same size.

The conversion processing unit 132 may perform, for example, first conversion processing on the input image and acquire an output image candidate, determine whether or not signal intensity of the output image candidate is within a range indicated by the range information, and, if it is determined that the signal intensity of the output image candidate is not within the range indicated by the range information, quantize the input image again and convert the input image such that the signal intensity is within the range indicated by the range information, thereby acquiring an output image. The first conversion processing is typically conventional image conversion processing. The first conversion processing is, for example, the above-described conventional conversion processing. The conversion processing unit 132 performs, for example, first conversion processing on the input image and acquires an output image candidate, and, if it is determined that the signal intensity of the output image candidate is within the range indicated by the range information, takes the output image candidate as the output image.

The conversion processing unit 132 may acquire an output image, for example, by repeating, twice or more, the conversion processing for making signal intensity within a range indicated by range information, until the signal intensity of the output image is within the range indicated by the range information.

The optical signal information changing unit 133 changes optical signal information that is stored, according to the optical signal information change instruction accepted by the user instruction accepting unit 122. The optical signal information that is stored is, for example, the optical signal information acquired by the optical signal information acquiring unit 131 according to the electrical signal information, or the optical signal information contained in the correspondence information in the storage unit 11.

The output unit 14 outputs the output image acquired by the conversion processing unit 132. The output is a concept that encompasses display on a display screen, projection using a projector, printing by a printer, output of a sound, transmission to an external apparatus, accumulation in a storage medium, delivery of a processing result to another processing apparatus or another program, and the like.

The storage unit 11 is preferably a non-volatile storage medium, but may be realized also by a volatile storage medium.

There is no limitation on the procedure in which information is stored in the storage unit 11. For example, information may be stored in the storage unit 11 via a storage medium, information transmitted via a communication line or the like may be stored in the storage unit 11, or information input via an input device may be stored in the storage unit 11.

The user instruction accepting unit 122 may be realized by a device driver for an input part such as a touch panel or a keyboard, or control software for a menu screen, for example.

The processing unit 13, the optical signal information acquiring unit 131, the conversion processing unit 132, and the optical signal information changing unit 133 may be realized typically by MPUs, memories, or the like. Typically, the processing procedure of the processing unit 13 and the like is realized by software, and the software is stored in a storage medium such as a ROM. Note that the processing procedure may be realized also by hardware (dedicated circuits).

The output unit 14 may be considered to include or not to include an output device, such as a display screen or a speaker. The output unit 14 may be realized, for example, by driver software for an output device, a combination of driver software for an output device and the output device, or the like.

Figure 2:
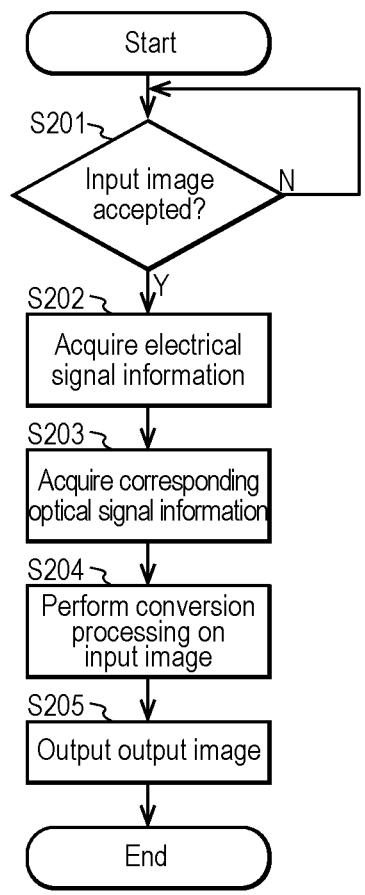
FIG. 2 is a flowchart illustrating an operation of the video signal processing apparatus 1 in the embodiment.

Next, an operation of the video signal processing apparatus 1 will be described with reference to the flowchart in FIG. 2.

(Step S201) The input image accepting unit 121 determines whether or not an input image has been accepted. If an input image has been accepted, the procedure advances to step S202, and, if not, the procedure returns to step S201.

(Step S202) The optical signal information acquiring unit 131 acquires one or more pieces of electrical signal information, from the input image that is accepted in step S201.

(Step S203) The optical signal information acquiring unit 131 acquires optical signal information corresponding to the electrical signal information acquired in step S202, using the correspondence information in the storage unit 11.

(Step S204) The conversion processing unit 132 performs conversion processing that acquires an output image from the input image that is accepted in step S201, using the optical signal information acquired by the optical signal information acquiring unit 131.

(Step S205) The output unit 14 outputs the output image acquired in step S204. The processing is ended.

Specific Example

Hereinafter, a specific operation of the video signal processing apparatus 1 in this embodiment will be described.

It is assumed that the storage unit 11 has correspondence information indicating correspondence between an optical signal feature and an electrical signal feature. The optical signal feature is information indicating that the resolution is infinite, or information indicating that there is no upper limit or lower limit of a signal range. The electrical signal feature is information indicating that quantization was performed at 10 bits, or information indicating a signal range (64 to 940). The correspondence information is, for example, information indicating correspondence between a range of electrical signal intensity and a range of optical signal intensity. The correspondence information is, for example, information indicating correspondence between electrical signal intensity and optical signal intensity.

Furthermore, it is assumed that conversion processing in this specific example is processing that, after an input image is subjected to conventional image conversion processing (first conversion processing, for example, the above-described conventional conversion processing), determines whether or not an image obtained through the conversion has a signal that is out of an acceptable range as an electrical signal, and, if there is a signal that is out of the allowable range, performs quantization again such that the signal is not truncated.

Figure 3:
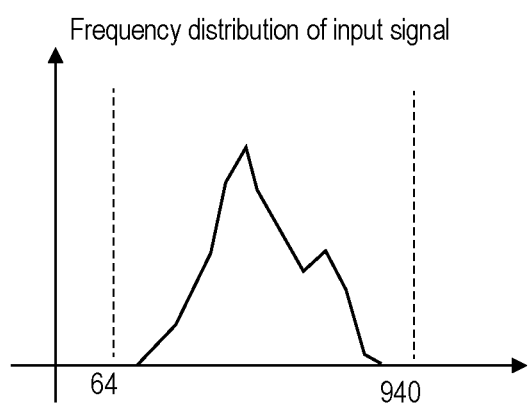
FIG. 3 is a graph showing frequency distribution of signal levels of an input image in the embodiment.

It is assumed that the input image accepting unit 121 has received an input image. Furthermore, it is assumed that frequency distribution of signal levels of the received input image is frequency distribution as shown in FIG. 3. In FIG. 3, the horizontal axis indicates signal intensity, and the vertical axis indicates frequency.

Figure 4:
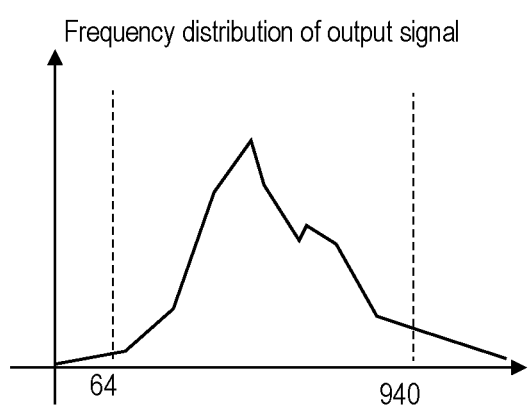
FIG. 4 is a graph showing frequency distribution of signal levels of an output image candidate in the embodiment.

Next, it is assumed that the processing unit 13 acquires an output image candidate, by performing the above-described conventional conversion processing on the input image. It is assumed that the output image candidate has frequency distribution as shown in FIG. 4.

Next, the optical signal information acquiring unit 131 acquires signal intensity (electrical signal intensity) from the input image.

Next, the optical signal information acquiring unit 131 acquires optical signal intensity corresponding to the acquired electrical signal intensity, from the correspondence information in the storage unit 11.

The conversion processing unit 132 converts the input image such that its intensity conforms to the optical signal intensity, thereby obtaining an output image candidate. Next, the conversion processing unit 132 determines whether or not the electrical signal intensity of the output image candidate is within the range of the information indicating the signal range. It is assumed that the conversion processing unit 132 has determined that, for example, the signal intensity of the output image candidate is not within the range (64 to 940) of the information indicating the signal range.

Figure 5:
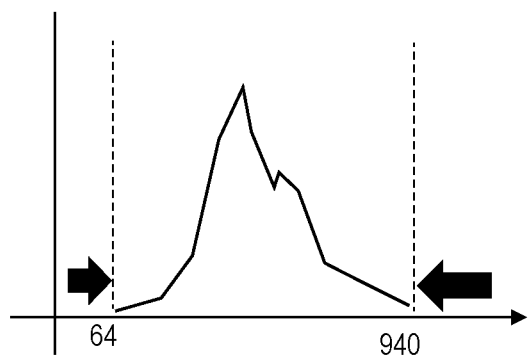
FIG. 5 is a graph showing frequency distribution of signal levels of an output image in the embodiment.

Next, the conversion processing unit 132 quantizes the input image again and converts the input image such that the signal intensity is within the range of the information indicating the signal range, thereby acquiring an output image. The output image has, for example, frequency distribution as shown in FIG. 5.

Next, the output unit 14 outputs the acquired output image. It will be appreciated that this output image is an image that conforms to laws as an optical signal.

As described above, according to this embodiment, it is possible to perform video signal processing in consideration of behavior of light in nature.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the video signal processing apparatus 1 in this embodiment is the following sort of program. Specifically, this program is a program for causing a computer-accessible storage medium to have a storage unit in which correspondence information indicating correspondence between optical signal information related to an optical signal in an environment in which an image is acquired and electrical signal information related to an electrical signal in the environment is stored, and causing a computer to function as: an input image accepting unit that accepts an input image; an optical signal information acquiring unit that acquires optical signal information corresponding to electrical signal information that is acquired from the input image accepted by the input image accepting unit, using the correspondence information; a conversion processing unit that performs conversion processing that acquires an output image from the input image, using the optical signal information acquired by the optical signal information acquiring unit; and an output unit that outputs the output image acquired by the conversion processing unit.

It is preferable that, according to the program, the correspondence information is a look-up table having two or more correspondence records each indicating correspondence between electrical signal information and optical signal information, and the optical signal information acquiring unit selects a correspondence record corresponding to electrical signal information that matches or is closest to electrical signal information that is acquired from the input image accepted by the input image accepting unit, and acquires optical signal information corresponding to the selected correspondence record.

It is preferable that, according to the program, the correspondence information has electrical signal information that is an operation expression corresponding to electrical signal information and related to a tap arranged in spacetime, the optical signal information acquiring unit acquires an operation expression corresponding to electrical signal information that is acquired from the input image accepted by the input image accepting unit, and the conversion processing unit performs conversion processing that converts the input image using the operation expression acquired by the optical signal information acquiring unit, thereby acquiring an output image.

It is preferable that, according to the program, the correspondence information is a look-up table having two or more correspondence records each indicating correspondence between electrical signal information and a processing identifier for identifying processing, the optical signal information acquiring unit selects a correspondence record corresponding to electrical signal information that matches or is closest to electrical signal information that is acquired from the input image accepted by the input image accepting unit, and acquires optical signal information that is a processing identifier corresponding to the selected correspondence record, and the conversion processing unit performs conversion processing that performs processing that is identified by the processing identifier acquired by the optical signal information acquiring unit, thereby acquiring an output image from the input image.

It is preferable that, according to the program, the conversion processing unit performs quality improving processing that converts the input image into an image with a higher quality, using the optical signal information acquired by the optical signal information acquiring unit, thereby acquiring an output image.

It is preferable that, according to the program, the conversion processing unit performs resolution increasing processing that converts the input image into an image with a higher resolution, using the optical signal information acquired by the optical signal information acquiring unit, thereby acquiring an output image.

It is preferable that, according to the program, the conversion processing unit performs noise removing processing on the input image, using the optical signal information acquired by the optical signal information acquiring unit, thereby acquiring an output image.

It is preferable that, according to the program, the optical signal information is range information indicating a signal range of an optical signal and an electrical signal, and the conversion processing unit performs first conversion processing on the input image and acquires an output image candidate, determines whether or not signal intensity of the output image candidate is within a range indicated by the range information, and, in a case where it is determined that the signal intensity of the output image candidate is not within the range indicated by the range information, quantizes the input image again and converts the input image such that the signal intensity is within the range indicated by the range information, thereby acquiring an output image.

Figure 6:
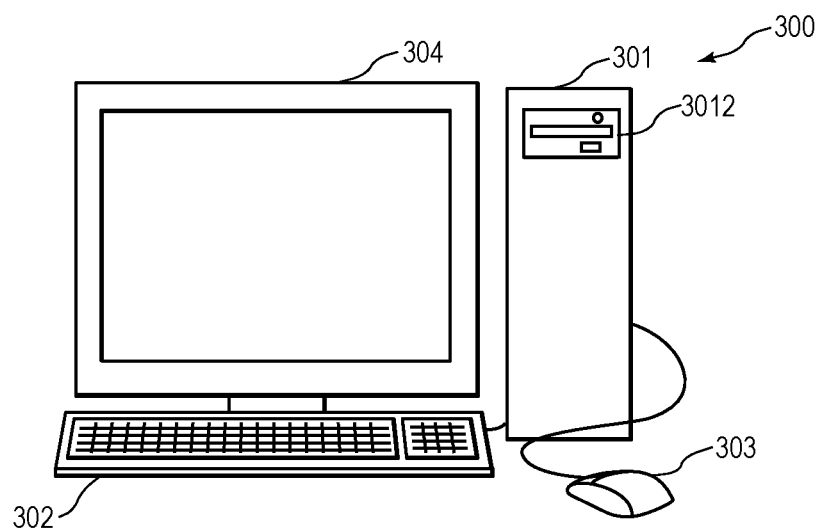
FIG. 6 is a schematic view of a computer system in the embodiment.
Figure 7:
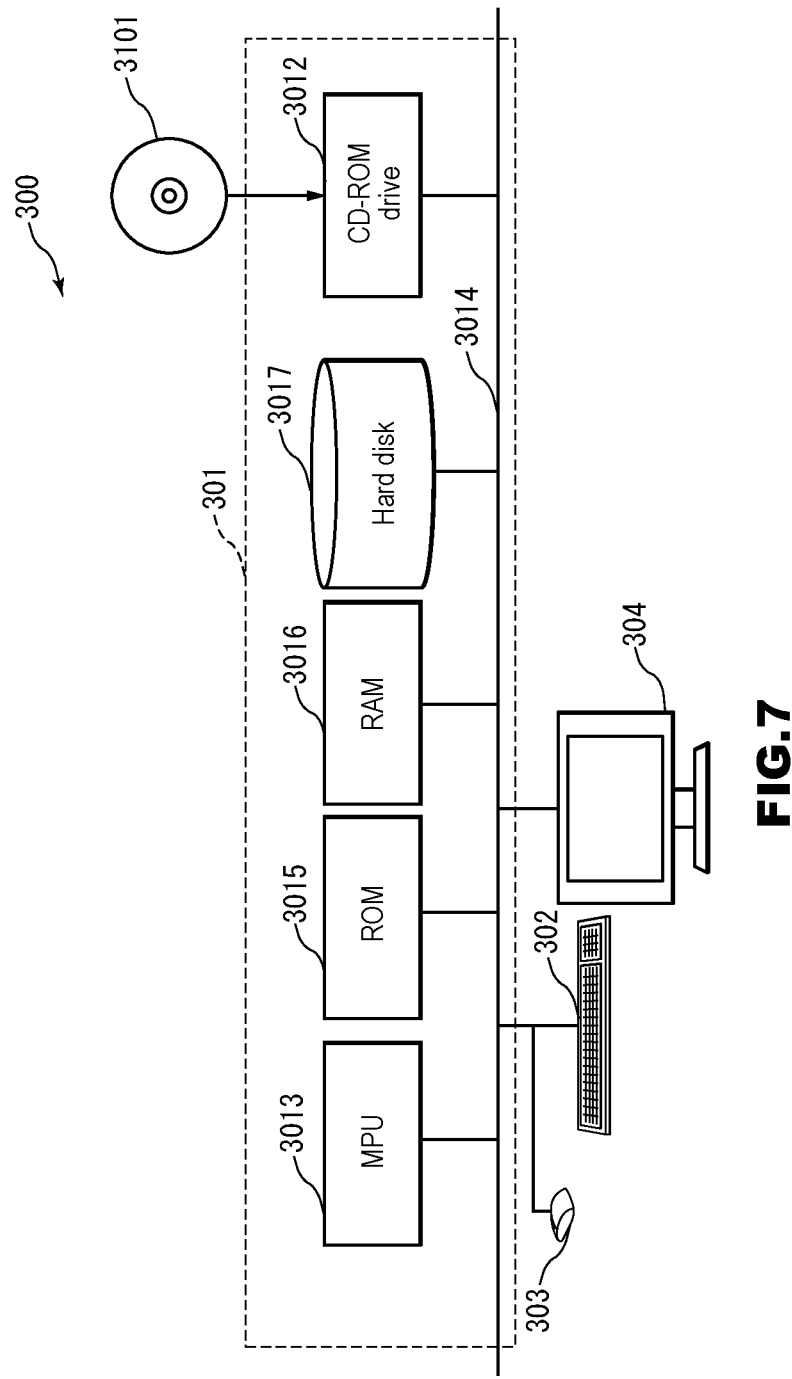
FIG. 7 is a block diagram of the computer system in the embodiment.

FIG. 6 shows the external appearance of a computer that executes the programs described in this specification to realize the video signal processing apparatus 1 in the foregoing various embodiments. The foregoing embodiments may be realized using computer hardware and a computer program executed thereon. FIG. 6 is a schematic view of a computer system 300. FIG. 7 is a block diagram of the system 300.

In FIG. 6, the computer system 300 includes a computer 301 including a CD-ROM drive 3012, a keyboard 302, a mouse 303, and a monitor 304.

In FIG. 7, the computer 301 includes the CD-ROM drive 3012, an MPU 3013, a bus 3014, a ROM 3015, a RAM 3016, and a hard disk 3017. In the ROM 3015, a program such as a boot up program is stored. The RAM 3016 is connected to the MPU 3013 and is a memory in which a command of an application program is temporarily stored and a temporary storage area is provided. In the hard disk 3017, typically, an application program, a system program, and data are stored. Although not shown, the computer 301 may further include a network card that provides connection to a LAN.

The programs for causing the computer system 300 to execute the functions of the video signal processing apparatus in the foregoing embodiments may be stored in a CD-ROM 3101 that is inserted into the CD-ROM drive 3012, and be transmitted to the hard disk 3017. Alternatively, the programs may be transmitted via a network (not shown) to the computer 301 and stored in the hard disk 3017. At the time of execution, the programs are loaded into the RAM 3016. The programs may be loaded from the CD-ROM 3101, or directly from a network.

The programs do not necessarily have to include, for example, an operating system (OS) or a third party program to cause the computer 301 to execute the functions of the video signal processing apparatus in the foregoing embodiments. The programs may only include a command portion to call an appropriate module in a controlled mode and obtain desired results. The manner in which the computer system 300 operates is well known, and thus a detailed description thereof has been omitted.

It should be noted that, in the programs, in a step of transmitting information, a step of receiving information, or the like, processing that is performed by hardware, for example, processing performed by a modem or an interface card in the transmitting step (processing that can be performed only by hardware) is not included.

Furthermore, the computer that executes the programs may be a single computer, or may be multiple computers. That is to say, centralized processing may be performed, or distributed processing may be performed.

Furthermore, in the foregoing embodiments, it will be appreciated that two or more communication parts (a terminal information transmitting unit, a terminal information receiving unit, etc.) in one apparatus may be physically realized by one medium.

In the foregoing embodiments, each process (each function) may be realized as centralized processing using a single apparatus (system), or may be realized as distributed processing using multiple apparatuses.

The present invention is not limited to the embodiment set forth herein. Various modifications are possible within the scope of the present invention.

As described above, the video signal processing apparatus according to the present invention has an effect that it is possible to perform video signal processing in consideration of behavior of light in nature, and thus this apparatus is useful as a television receiver and the like.

What is claimed is:

1. A video signal processing apparatus comprising:
    a storage unit in which correspondence information indicating correspondence between optical signal information related to an optical signal in an environment in which an image is acquired and electrical signal information related to an electrical signal in the environment is stored;
    an input image accepting unit that accepts an input image;
    an optical signal information acquiring unit that acquires electrical signal information of the input image accepted by the input image accepting unit, and acquires corresponding optical signal information corresponding to the electrical signal information of the input image, using the correspondence information;
    a conversion processing unit that performs conversion processing that acquires an output image from the input image, using the corresponding optical signal information acquired by the optical signal information acquiring unit; and
    an output unit that outputs the output image acquired by the conversion processing unit, wherein:
    the optical signal information comprises one selected from the group consisting of:
        information indicating that resolution is infinite;
        information indicating that there is no upper limit or lower limit of a signal range, which is an amplitude of signal intensity;
        light amount change information indicating a change in an amount of light in a unit time or a predetermined period of time;
        diffusion level change information indicating a change in a diffusion level of a light source in a unit time or a predetermined period of time;
        light source positional change information indicating a continuous change in a position of a light source in a unit time or a predetermined period of time;
        information indicating whether light that is shining on an object in an image is direct light or diffused light; and
        information indicating whether light that is reflected by an object in part of an image mirror-reflected or diffuse-reflected, and
    the electrical signal information comprises one selected from the group consisting of:
        information indicating that quantization was performed at a particular number of bits;
        information indicating a signal range;
        a proper amount of change in an electrical signal;
        a processing identifier;
        image change specifying information for specifying a change in an image;
        information indicating an amount of change in a pixel value; and
        information indicating an amount of change in luminance.

2. The video signal processing apparatus according to claim 1,
    wherein the correspondence information is a look-up table having two or more correspondence records each indicating correspondence between the electrical signal information and the optical signal information, and
    the optical signal information acquiring unit selects a correspondence record corresponding to electrical signal information that matches or is closest to the electrical signal information of the input image, and acquires the corresponding optical signal information corresponding to the selected correspondence record.

3. The video signal processing apparatus according to claim 1,
    wherein the correspondence information comprises electrical signal information that is an operation expression corresponding to the electrical signal information and related to a tap arranged in spacetime, the optical signal information acquiring unit acquires an operation expression corresponding to the electrical signal information of the input image, and the conversion processing unit performs conversion processing that converts the input image using the operation expression acquired by the optical signal information acquiring unit, thereby acquiring the output image.

4. The video signal processing apparatus according to claim 1, wherein the correspondence information is a look-up table having two or more correspondence records each indicating correspondence between the electrical signal information and a processing identifier for identifying processing, the optical signal information acquiring unit selects a correspondence record corresponding to electrical signal information that matches or is closest to the electrical signal information of the input image, and acquires the corresponding optical signal information that is a processing identifier corresponding to the selected correspondence record, and the conversion processing unit performs conversion processing that performs processing that is identified by the processing identifier acquired by the optical signal information acquiring unit, thereby acquiring the output image from the input image.

5. The video signal processing apparatus according to claim 1, wherein the conversion processing unit performs quality improving processing that converts the input image into an image with a higher quality, using the corresponding optical signal information acquired by the optical signal information acquiring unit, thereby acquiring the output image.

6. The video signal processing apparatus according to claim 1, wherein the conversion processing unit performs resolution increasing processing that converts the input image into an image with a higher resolution, using the corresponding optical signal information acquired by the optical signal information acquiring unit, thereby acquiring the output image.

7. The video signal processing apparatus according to claim 1, wherein the conversion processing unit performs noise removing processing on the input image, using the corresponding optical signal information acquired by the optical signal information acquiring unit, thereby acquiring the output image.

8. The video signal processing apparatus according to claim 1, wherein the optical signal information acquiring unit determines whether light that is shining on an object in the input image is direct light or diffused light, using the electrical signal information of the input image, and in a case where the optical signal information acquiring unit determines that the light is direct light, the conversion processing unit performs conversion processing that modifies pixel values of pixels in the input image so as to emphasize a difference or a ratio between brightness and darkness in the entire input image, thereby acquiring the output image from the input image.

9. The video signal processing apparatus according to claim 1, wherein the optical signal information acquiring unit determines whether light that is shining on an object in the input image is direct light or diffused light, using the electrical signal information of the input image, and in a case where the optical signal information acquiring unit determines that the light is diffused light, the conversion processing unit performs conversion processing that modifies pixel values of pixels in the input image so as to reduce a difference or a ratio between brightness and darkness in the entire input image, thereby acquiring the output image from the input image.

10. The video signal processing apparatus according to claim 1, wherein the optical signal information acquiring unit divides the input image into two or more blocks, and determines whether light that is reflected by an object in each block is mirror-reflected or diffuse-reflected, using electrical signal information of the each block, and for a block in which it is determined by the optical signal information acquiring unit that light is mirror-reflected, the conversion processing unit performs conversion processing that modifies pixel values of pixels in the block so as to emphasize a difference or a ratio between brightness and darkness in the entire block, thereby acquiring the output image from the input image.

11. The video signal processing apparatus according to claim 1, wherein the optical signal information acquiring unit divides the input image into two or more blocks, and determines whether light that is reflected by an object in each block is mirror-reflected or diffuse-reflected, using electrical signal information of the each block, and for a block in which it is determined by the optical signal information acquiring unit that light is diffuse-reflected, the conversion processing unit performs conversion processing that modifies pixel values of pixels in the block so as to reduce a difference or a ratio between brightness and darkness in the entire block, thereby acquiring the output image from the input image.

12. The video signal processing apparatus according to claim 1, further comprising:

a user instruction accepting unit that accepts an optical signal information change instruction to change the optical signal information; and an optical signal information changing unit that changes the optical signal information that is stored in the storage unit, according to the optical signal information change instruction, wherein the conversion processing unit acquires the output image, using the optical signal information changed according to the optical signal information change instruction.

13. A video signal processing method, using a storage medium including a storage unit in which correspondence information indicating correspondence between optical signal information related to an optical signal in an environment in which an image is acquired and electrical signal information related to an electrical signal in the environment is stored, the method realized by an input image accepting unit, an optical signal information acquiring unit, a conversion processing unit, and an output unit, comprising:

an input image accepting step of the input image accepting unit accepting an input image;

an optical signal information acquiring step of the optical signal information acquiring unit acquiring electrical signal information of the input image accepted in the input image accepting step, and acquiring corresponding optical signal information corresponding to the electrical signal information of the input image, using the correspondence information;

a conversion processing step of the conversion processing unit performing conversion processing that acquires an output image from the input image, using the corresponding optical signal information acquired in the optical signal information acquiring step; and an output step of the output unit outputting the output image acquired in the conversion processing step, wherein:

the optical signal information comprises one selected from the group consisting of:
information indicating that resolution is infinite;
information indicating that there is no upper limit or lower limit of a signal range, which is an amplitude of signal intensity;
light amount change information indicating a change in an amount of light in a unit time or a predetermined period of time;
diffusion level change information indicating a change in a diffusion level of a light source in a unit time or a predetermined period of time;
light source positional change information indicating a continuous change in a position of a light source in a unit time or a predetermined period of time;
information indicating whether light that is shining on an object in an image is direct light or diffused light; and
information indicating whether light that is reflected by an object in part of an image mirror-reflected or diffuse-reflected, and the electrical signal information comprises one selected from the group consisting of:
information indicating that quantization was performed at a particular number of bits;
information indicating a signal range;
a proper amount of change in an electrical signal;
a processing identifier;
image change specifying information for specifying a change in an image;
information indicating an amount of change in a pixel value; and
information indicating an amount of change in luminance.

14. A non-transitory computer readable medium storing a program for causing a computer capable of accessing a storage medium including a storage unit in which correspondence information indicating correspondence between optical signal information related to an optical signal in an environment in which an image is acquired and electrical signal information related to an electrical signal in the environment is stored, to function as:

an input image accepting unit that accepts an input image;

an optical signal information acquiring unit that acquires electrical signal information of the input image accepted by the input image accepting unit, and acquires corresponding optical signal information corresponding to the electrical signal information of the input image, using the correspondence information;

a conversion processing unit that performs conversion processing that acquires an output image from the input image, using the corresponding optical signal information acquired by the optical signal information acquiring unit; and an output unit that outputs the output image acquired by the conversion processing unit, wherein:

the optical signal information comprises one selected from the group consisting of:
information indicating that resolution is infinite;
information indicating that there is no upper limit or lower limit of a signal range, which is an amplitude of signal intensity;
light amount change information indicating a change in an amount of light in a unit time or a predetermined period of time;
diffusion level change information indicating a change in a diffusion level of a light source in a unit time or a predetermined period of time;
light source positional change information indicating a continuous change in a position of a light source in a unit time or a predetermined period of time;
information indicating whether light that is shining on an object in an image is direct light or diffused light; and
information indicating whether light that is reflected by an object in part of an image mirror-reflected or diffuse-reflected, and the electrical signal information comprises one selected from the group consisting of:
information indicating that quantization was performed at a particular number of bits;
information indicating a signal range;
a proper amount of change in an electrical signal;
a processing identifier;
image change specifying information for specifying a change in an image;
information indicating an amount of change in a pixel value; and
information indicating an amount of change in luminance.

15. The video signal processing apparatus according to claim 1, comprising a processor and a memory storing a program, wherein the program when executed by the processor, causes the processor to function at least as the input image accepting unit, then optical signal information acquiring unit, and the conversion processing unit.

* * * * *